July 4, 1944.　　　　W. STRAUSS　　　　2,352,809
FEED DEVICE FOR POWDERED MATERIAL
Filed Nov. 30, 1942　　2 Sheets-Sheet 2
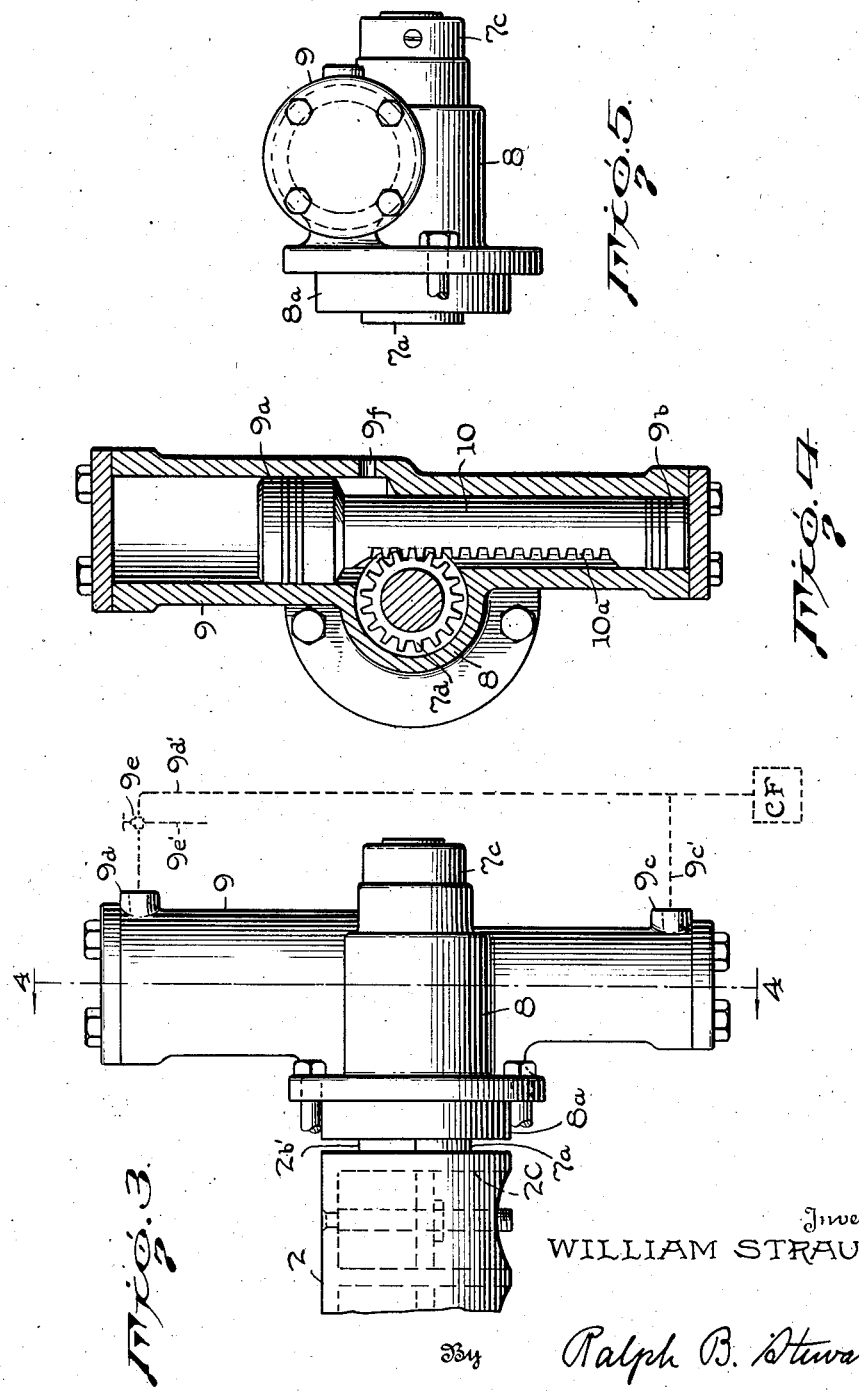
Inventor
WILLIAM STRAUSS
By Ralph B. Stewart
Attorney Patented July 4, 1944

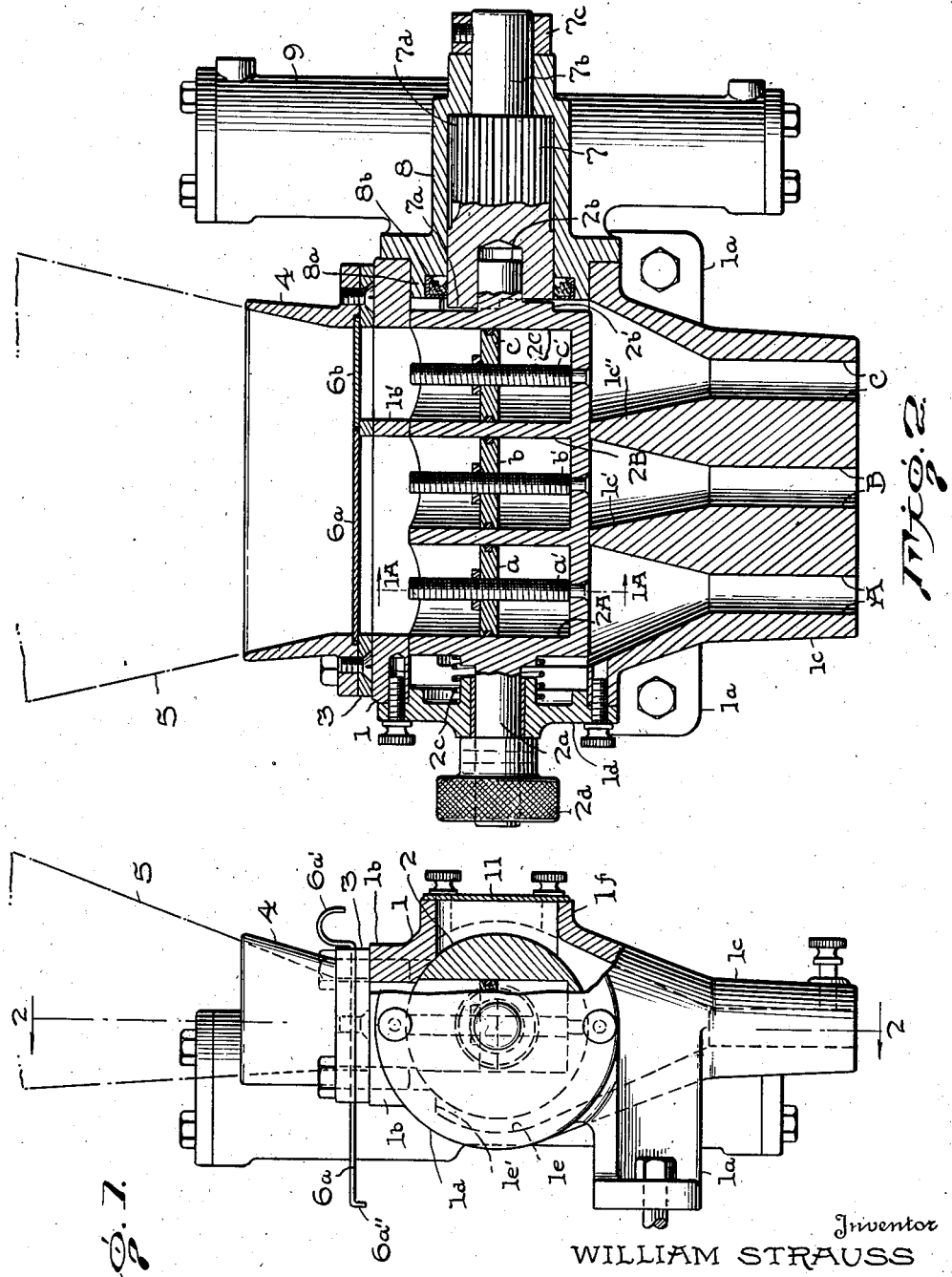

2,352,809

UNITED STATES PATENT OFFICE 2,352,809

FEED DEVICE FOR POWDERED MATERIAL

William Strauss, Philadelphia, Pa., assignor to F. J. Stokes Machine Company, a corporation of Pennsylvania Application November 30, 1942, Serial No. 467,361

7 Claims. (Cl. 222—156)

This invention relates to a feed device for powdered or granular material. It is especially useful for feeding or charging powdered or granular molding material into the cavities of a molding press, but it will be found useful in many applications where it is desired to feed, measure or dispense a predetermined quantity of powdered or granular material.

The invention is concerned with a feed device of the type which involves a rotary cylindrical element embodied in the outlet passage of a hopper containing the granular material, and the rotary cylindrical element is provided with one or more measuring cavities of adjustable volume.

An object of the invention is to devise a feed device of the type described which can be easily adjusted and cleaned.

A further object is to devise an operating mechanism for the feed device which when energized operates the feeding cylinder from its loading position to its unloading position, and including biasing means for returning the cylinder to its loading position after the operating mechanism is deenergized.

Still another object is to devise a clutch element interposed between the operating mechanism and the feeding cylinder to permit uncoupling of the cylinder from the operating mechanism when it is desired to clean or adjust the measuring cavities.

Still another object is to devise a feed device having a number of measuring cavities and including a number of cut-off gates interposed between the cylinder and the lower end of the hopper whereby the measuring cavities may be selectively cut off from the supply hopper.

A preferred embodiment of my invention is illustrated in the accompanying drawings in which Figure 1 is an end elevational view of the feed device shown partly in section;

Figure 2 is a sectional view of Figure 1 taken along the line 2—2;

Figure 3 is a front elevational view of the cylinder operating mechanism and showing the righthand end of the cylinder with the casing removed;

Figure 4 is a sectional view of Figure 3 taken along the line 4—4; and

Figure 5 is a plan view of the cylinder operating mechanism.

Referring to the drawings, the feed device consists of a housing or casing 1 preferably formed of cast metal and having a horizontal cylindrical bore therein for receiving the measuring cylinder 2. Casing 1 is provided with an integral bracket 1a by which the feed device is mounted upon any suitable support, for example upon the frame of a molding press. At the top of casing 1 is a boss 1b having a flat horizontal surface, and this boss is provided with an inlet port or passage which communicates with the measuring cylinder. A partition 1b' divides the inlet passage into two sections as shown in Figure 2. A plate 3 is mounted on boss 1b and is apertured in the same manner as boss 1b to provide an inlet passage of two sections. A ring or collar 4 which supports a supply hopper 5 is mounted on plate 3 and is secured to the plate by suitable bolts or other fastening devices passing through a flange formed on the lower end of collar 4. The lower face of collar 4 is recessed to provide a narrow slot between plate 3 and collar 4, and a pair of cut-off gates 6a and 6b are slidably mounted in this slot above the two sections of the inlet passage. These gates may be formed of sheet metal and provided with a curved handle on the front edge thereof as shown at 6a' in Figure 1 for sliding the gate forward or backward. A flange such as 6a'' in Figure 1 may be provided at the rear end of the gate to prevent withdrawal of the gate. It will be understood that each gate is apertured so that in one position of the gate the inlet passage will be open and in the other position the passage will be closed.

On the lower side of casing 1 is an extension 1c which has three outlet passages A, B and C formed therein. These outlet passages are generally of funnel shape as shown in Figure 2. The passages are separated by partitions 1c' and 1c'' which fit closely against measuring cylinder 2.

Measuring cylinder 2 is provided with stub shafts 2a and 2b at the ends thereof, shaft 2a being journaled in a bearing carried by an end plate 1d removably secured to the casing 1 and shaft 2b being journaled in drive shaft 7 of the driving mechanism. Shaft 7 has a shoulder 7a which cooperates with a shoulder 2b' surrounding shaft 2b to form a clutch construction whereby measuring cylinder 2 is driven from shaft 7. Any other suitable clutch construction may be employed provided it permits driving engagement of the cylinder 2 with shaft 7 only in one predetermined relative position of the two elements. A coiled spring 2c surrounding stub shaft 2a and interposed between the left end of cylinder 2 and cover plate 1a (Figure 2) serves to urge cylinder 2 into driving engagement with shaft 7. A suitable knob 2d is secured to the outer end of shaft 2a by which the measuring cylinder may be pulled out of driving engagement with shaft 7 and rotated to any desired position by hand.

Measuring cylinder 2 is provided with three cylindrical bores 2A, 2B and 2C formed transversely of the axis of the cylinder and serving as measuring cavities. These cavities are provided with adjustable bottoms consisting of circular plates a, b and c having threaded engagement with pins a', b' and c' secured in the bottom of the cavities and extending along the axes of the cavities. By adjusting the position of the circular plates a, b and c by means of a suitable wrench, the volume of the cavities may be set at any desired amount within the limits of the device.

Drive shaft 7 is supported and journaled in a sleeve 8 mounted upon the casing 1 by means of a flanged cylindrical extension 8a extending into the cylindrical bore of the casing. A suitable oil sealing ring 8b is positioned in an annular counterbore formed in extension 8a and surrounds the inner end of shaft 7 to prevent the passing of oil or grease from the driving mechanism into the feed device. The inner end of shaft 7 is journaled in the bore of sleeve 8, and the outer end is formed with a section 7b of reduced diameter which is journaled in a bearing formed at the end of sleeve 8. A suitable collar 7c mounted on the end of shaft section 7b prevents axial displacement of the shaft 7. Gear teeth 7d are formed on an intermediate section of shaft 7, and this portion of the shaft acts as a pinion.

Various arrangements may be devised for driving shaft 7, but the arrangement which I prefer is shown in detail in the drawings and consists of a reciprocating rack engaging the pinion section 7d of shaft 7 and is driven in opposite directions by means of two pistons which may be propelled either by compressed fluid such as air, or by a liquid under pressure. More specifically, the driving mechanism includes a double-ended cylinder 9 having a larger bore at the upper end than at the lower end and preferably being formed integral with sleeve 8 which is detachably secured to the casing 1. A piston 9a with suitable packing rings is mounted to reciprocate within the upper end of cylinder 9, and a smaller piston 9b is mounted to reciprocate in the lower end of cylinder 9. These two pistons are secured together by means of a rack formed of bar 10 provided with gear teeth 10a positioned to engage and drive pinion 7d when the pistons are reciprocated. The lower end of cylinder 9 has a connection 9c for a pipe line represented by the dotted line 9c' leading to a source of compressed fluid represented at CF or to a source of liquid under pressure. The upper end of the cylinder 9 is also provided with a connection 9d for a pipe line represented by the dotted line 9d' leading to the same source through a normally closed 3-way control valve 9e which normally cuts off supply CF and exhausts the upper cylinder through exhaust 9e'. A suitable vent opening 9f is provided in cylinder 9 at the inner end of the larger bore to permit breathing of the space to the rear of piston 9a during reciprocation of this piston.

Operation of the feed device is as follows: It will be understood that fluid pressure is normally cut off from the larger bore of cylinder 9 and is always applied to the smaller bore of the cylinder, whereby rack 10 is driven upwardly and the measuring cylinder 2 normally occupies the loading position shown in Figures 1 and 2 where the measuring cavities are in a position to receive material from the hopper. Upon opening of valve 9e, either by hand or mechanically, compressed fluid is admitted to the larger bore, and the greater pressure acting on the piston 9a forces the rack 10 downwardly, thus rotating measuring cylinder 2 in an anti-clockwise direction as shown in Figure 1 to the position shown in Figures 3 and 4. In this position, the measuring cavities 2A, 2B and 2C discharge their contents into the individual discharge passages A, B and C from which the charges may be directed into the mold cavities of a molding press or may be directed into any other devices such as empty containers in a packaging machine. As soon as valve 9e is closed, pressure is cut off from piston 9a and the pressure exerted on piston 9b moves rack 10 upwardly to return the measuring cylinder to its normal or loading position. Any other suitable biasing means may be provided for returning the rack 10 to its upper position, but I prefer the arrangement shown, since it provides a uniform driving force on rack 10 throughout its movement whereas a spring element would provide a decreasing force.

The inner surface of the cylindrical bore within casing 1 is recessed at the upper ends of discharge passages A, B and C as shown by the dotted line 1e in Figure 1, but the partitions 1c' and 1c'' are not recessed but have close fitting contact with cylinder 2. The recessing of the wall of the cylindrical bore in casing 1 extends up to the point 1e', as shown in Figure 1, thus leaving an uninterrupted strip of the bore wall in close contact with the cylinder 2 between the edge of the inlet passage formed in boss 1b and the edge of recess 1e. The purpose of providing the recess is to reduce the friction between cylinder 2 and the wall of the cylindrical bore in casing 1.

As shown in Figure 1, the front side of casing 1 is provided with a cored boss 1f which has an opening providing access to cylinder 2. A suitable cover plate 11 is removably mounted over the opening in boss 1f to prevent dust from entering or leaving the feed device. The opening in boss 1f is sufficiently large to permit removal of circular plates a, b, and c forming adjustable bottoms in measuring cavities 2A, 2B and 2C. When it is desired to make adjustment of the volume of the measuring cavities, plate 11 is removed and the measuring cylinder is uncoupled from driving shaft 7 by pulling the cylinder to the left as shown in Figure 2 by means of the knob 2d, and the cylinder is then rotated in a clockwise direction in Figure 1 until the measuring cavities face outwardly through the opening in boss 1f. In this position of cylinder 2 a suitable wrench may be introduced through the opening of boss 1f and the circular plates a, b, c may be rotated and adjusted to the desired position. This arrangement also facilitates a quick inspection and cleaning of the measuring cavities.

It will be noted that cut-off gate 6a controls the supply of granular material to measuring cavities 2A and 2B while cut-off 6b controls the supply of material to cavity 2C. By this arrangement, only two gates are required to set up four conditions of operation; that is, (1) the supply may be cut off from all three cavities, (2) the supply may be opened to one cavity, (3) the supply may be opened to two cavities and (4) the supply may be opened to all three cavities.

By providing a clutch element of the type described between shaft 7 and measuring cylinder 2, that is, a clutch which will effect a driving connection only for a certain relative position between the two elements, there is no possibility that the measuring cylinder will be incorrectly coupled to the driving shaft 7, and in case the operator should fail to recouple the cylinder, it will become automatically recoupled on the next operation of the driving mechanism.

What I claim is:

1. A feed device comprising, in combination, a fixed horizontally disposed cylindrical casing having an inlet opening on the top side thereof and an outlet opening on the bottom side thereof, a rotary measuring cylinder mounted for rotation in said casing and having a measuring cavity therein, operating means movable through a predetermined range for rotating said measuring cylinder from a loading position to an unloading position and to thereby invert said measuring cavity, said casing including an inspection opening located at a point outside of the range of movement of said measuring cavity in moving between loading and unloading positions, and means for uncoupling said measuring cylinder from said operating means to permit rotation thereof to a position where the opening of said measuring cavity comes into registry with said inspection opening.

2. A feed device according to claim 1 wherein said measuring cavity includes means adjustable from within said cavity for varying the volume of said cavity, said means being adjustable from without said casing and through said inspection opening when said measuring cavity is in registry with said inspection opening.

3. A feed device according to claim 1 wherein said means for uncoupling the measuring cylinder from said operating means includes a driving clutch having one element thereof carried by said measuring cylinder, and said measuring cylinder being mounted for axial movement to disengage said clutch element.

4. A feed device comprising, in combination, a fixed horizontally disposed cylindrical casing having an inlet opening on the top side thereof and an outlet opening on the bottom side thereof, a rotary measuring cylinder mounted for rotation in said casing and having a measuring cavity therein, rotary driving means mounted in axial alignment with said measuring cylinder, means for rotating said driving means through a predetermined angular displacement, a clutch for coupling said driving means with said rotary cylinder, said cylinder being movable axially in said casing to uncouple said clutch, biasing means for urging said cylinder in a direction to normally maintain engagement of said clutch, and means extending to the outside of said casing by which said measuring cylinder may be axially moved against said biasing means to uncouple said cylinder from said driving means and to permit rotation of said cylinder outside of the limits of rotation of said driving means.

5. A feed device according to claim 1 and including biasing means for normally holding said measuring cylinder in its loading position.

6. A feed device according to claim 1 wherein the operating means for rotating the measuring cylinder comprises a pinion secured to the shaft of said cylinder, a rack for driving said pinion, said rack being mounted within a double-ended cylinder and being supported between and reciprocated by two pistons of different diameters operating in opposite ends of said cylinder.

7. A feed device comprising a horizontal cylindrical casing, a rotary measuring cylinder mounted for rotation in said casing and having a plurality of measuring cavities formed transversely therein, means in each cavity and adjustable through the openings of said cavities for varying the volume of each cavity, operating means movable between two predetermined positions for rotating said measuring cylinder between a loading position and an unloading position, said casing including an inspection opening located at a point outside of the range of movement of said measuring cavities in moving between loading and unloading positions, a releasable clutch element interposed between said measuring cylinder and said operating means to permit uncoupling of said cylinder from said operating means, and means for manually rotating said cylinder to a position where the openings of said measuring cavities come into registry with said inspection opening.

WILLIAM STRAUSS.